(12) United States Patent
Chang et al.

(10) Patent No.: US 8,924,645 B2
(45) Date of Patent: Dec. 30, 2014

(54) DATA STORAGE APPARATUS AND METHODS

(75) Inventors: Jichuan Chang, Mountain View, CA (US); Parthasarathy Ranganathan, San Jose, CA (US); David Andrew Roberts, Ann Arbor, MI (US); Mehul A. Shah, Santa Clara, CA (US); John Sontag, Santa Clara, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 208 days.

(21) Appl. No.: 13/387,718

(22) PCT Filed: Mar. 7, 2011

(86) PCT No.: PCT/US2011/027443
§ 371 (c)(1),
(2), (4) Date: Jan. 27, 2012

(87) PCT Pub. No.: WO2011/112523
PCT Pub. Date: Sep. 15, 2011

(65) Prior Publication Data
US 2012/0131278 A1 May 24, 2012

Related U.S. Application Data

(60) Provisional application No. 61/311,744, filed on Mar. 8, 2010.

(51) Int. Cl.
*G06F 12/00* (2006.01)
*G06F 12/08* (2006.01)

(52) U.S. Cl.
CPC ........ *G06F 12/0893* (2013.01); *G06F 12/0888* (2013.01)
USPC .................................... 711/118; 711/E12.017

(58) Field of Classification Search
CPC ......................... G06F 12/0888; G06F 12/0893
USPC ......................................................... 711/118
See application file for complete search history.

(56) References Cited

U.S. PATENT DOCUMENTS

| | | | |
|---|---|---|---|
| 5,809,532 A * | 9/1998 | Eno et al. ...................... | 711/141 |
| 6,151,664 A | 11/2000 | Borkenhagen et al. | |
| 2005/0223259 A1 | 10/2005 | Lehwalder et al. | |
| 2006/0112233 A1* | 5/2006 | Hu et al. ...................... | 711/138 |
| 2007/0043965 A1 | 2/2007 | Mandelblat et al. | |

(Continued)

FOREIGN PATENT DOCUMENTS

| | | |
|---|---|---|
| JP | 1985-196860 | 10/1985 |
| JP | 1993-035594 | 2/1993 |

(Continued)

OTHER PUBLICATIONS

International Search Report, PCT/US2011/027443, Nov. 16, 2011, 10 pages.

(Continued)

*Primary Examiner* — Aracelis Ruiz

(57) ABSTRACT

Data storage apparatus and methods are disclosed. A disclosed example data storage apparatus comprises a cache layer and a processor in communication with the cache layer. The processor is to dynamically enable or disable the cache layer via a cache layer enable line based on a data store access type.

16 Claims, 9 Drawing Sheets

(56) References Cited

U.S. PATENT DOCUMENTS

| | | | |
|---|---|---|---|
| 2007/0288683 A1 | 12/2007 | Panabaker et al. | |
| 2008/0104329 A1* | 5/2008 | Gaither et al. | 711/138 |
| 2009/0006756 A1 | 1/2009 | Donley | |
| 2009/0182944 A1* | 7/2009 | Comparan et al. | 711/122 |
| 2010/0274962 A1* | 10/2010 | Mosek et al. | 711/113 |

FOREIGN PATENT DOCUMENTS

| | | |
|---|---|---|
| JP | 1999-328043 | 11/1999 |
| JP | 2000-305717 | 11/2000 |
| JP | 2003-530640 | 10/2001 |
| JP | 2006-309734 | 11/2006 |
| JP | 2009-282880 | 12/2009 |

OTHER PUBLICATIONS

Abts et al., "Energy proportional datacenter networks," ISCA, Jun. 19-23, 2010 (10 pages).

Ahn, et al., "HyperX: Topology, Routing, and Packaging of Efficient Large-Scale Networks," Proc. Conference ~ SC'09 , Nov. 14-20, 2009 (pp. 1-11).

Ailamaki, Anastassia, "Database Architectures for New Hardware," 30th Conference on Very Large Databases, Toronto, Canada (invited tutorial), 2004 (1 page), Sep. 2004.

Andersen, et al, "Fawn: A Fast Array of Wimpy Nodes," Proc. SOSP, Oct. 11-14, 2009 (17 pages).

Argollo, et al., "COTSon: Infrastructure for System-Level Simulation," HP Labs ~ HPL-2008-189, Nov. 6, 2008 (11 pages).

Azuma, et al., "High-Performance Sort Chip," Hot Chips, 1999 (11 pages), Aug. 1999.

Boncz, et al., "Breaking the Memory Wail in MonetDB," Commun. ACM, Dec. 2008 (pp. 77-85).

Borkar, Shekhar, "The Exascale Challenge," invited talk. Nov. 11, 2010, [available at http://cache-www.intel.com/cd/00/00/46/43/464316_464316.pdf] (30 pages).

Caulreld, et al., "Gordon: An Improved Architecture for Data-initensive Applications," IEEE Micro, 2010 (30(1):121-130)), Jan.-Feb. 2, 2010.

Coburn et al., "NV-Heaps:. Making Persistent Objects Fast and Safe with Next-Generation, Non-Volatile Memories," ASPLOS '11, 2011 (13 pages), Mar. 2011.

Cockcroft, Adrian, "Millicomputing: The Future in Your Pocket and Your Datacenter," USENIX Conference, Invited Talk, Jun. 27, 2008 (43 pages).

Condit, et al., "Better I/O through Byte-Addressable, Persistent Memory," Proc. ACM SIGOPS 22nd Annual Symposium on Operating Systems Principles, Oct. 2009 (133-146).

Cook, "Memory: the Real Data Center Bottleneck," Symbian Developers' Journal, Dec. 10, 2009, [retrieved from http://symbian.syscon.com/node/1061473 on Dec. 24, 2009] (6).

Dally, "Moving the Needle: Effective Computer Architecture Research in Academe and Industry," Proc. 37th International Symposium on Computer Architecture, Jun. 2010~(1).

Dean "Challenges in Building Large-Scale Information Retrieval Systems," Proc. 2nd Annual ACM Conference on Web Search and Data Mining, 2009 (77 pages), Feb. 2009.

Dean et al., "Mapreduce: Simplified Data Processing on Large Clusters," OSDI-2004 (13), Dec. 2004.

Dreslinski, et al., "Reconfigurable Multicore Server Processors for Low Power Operation,"SAMOS '09: Poceedings of the 9th International Workshop, 2009 (8 pages), May 2009.

Facchni, et al., "System-Level Power/Performance Evaluation of 3D Stacked Drams for Mobile Applications," Date, Apr. 2009 (pp. 923-928).

Gray, et al., "E-Science: The Next Decade Will Be Exciting," May 29, 2006 [available at http://www.signallake.com/innovation/JGrayETH_E_Science.pdf] (46 pages).

Grokhale, et al., "Processing in Memory: the Terasys Massively Parallel PIM Array," Computer, Apr. 1995 (28(4):23-31).

Hamilton, James, "Internet-Scale Service Infrastructure Efficiency," Keynote, ISCA, Jun. 2009 ~ 25 pages.

Han, et al., "Perspectives of Read Head Technology for 10 tb/in Recording," IEEE Trans on Magnetics, vol. 46, Mar. 2010 (pp. 709-714).

Harrison, et al., "Investigating Flash Memory Wear Levelling and Execution Modes:" SPECTS 2009, International Symposium, vol. 41, Jul. 2009 (pp. 81-88).

He, et al., "Mars: A Mapreduce Framework on Graphics Processors," PACT '08: Proceedings of the 17th international conference~Oct. 25-29, 2008 (pp. 260-269).

Hwu, et al., "Implicitly Parallel Programming Models for Thousand-Core Microprocessors:" DAC '07: 44th ACM/IEEE Design Automation Conf, Jun. 2007 (754-759).

International Technology Roadmap for Semiconductors (ITRS), 2009 [retrieved from http://www.itrs.net/links/2009ITRS/Home2009,htm on May 12, 2011] (2 pages).

Jiang, et al., "Storage Coding for Wear Leveling in Flash Memories," !ISIT 2009, IEEE International Symposium on Information Theory, Jul. 2009 (pp. 1229-1233).

Josephson: et al., "DFS: A File System for Virtualized Flash Storage," FAST '10, 201 (15 pages), Sep. 2010.

Jouppi, et al., "Emerging Technologies and Their impact on System Design," Proc. 15th Int'l Conf on Architectural Supp for Programming Languages and Oper Sys, 2010 (138), Aug. 2010.

Kang et al., "An Efficient Data-Distribution Mechanism in a Processor-In-Memory (PIM) Architecture Applied to Motion Estimation," IEEE Trans on Computers, Mar. 2008 ~ 14 pgs.

Kgil et al., "PicoServer: Using 3D Stacking Technology To Enable A Compact Energy Efficient Chip Multiprocessor," ASPLOS, 2006 (12 pages), Oct. 2006.

Kgil et al., "FlashCache: A NAND Flash Memory File Cache for Low Power Web Servers," Proc. Int'l Conf~Compilers, Architecture and Synthesis for Embedded Sys, Oct. 2006 (10).

Kgil, et al., "Improving NAND Flash Based Disk Caches," ISCA '08: Proceedings of the 35th International Symposium on Computer Architecture, 2008 (pp. 327-338), Jun. 2008.

Kim, et al., "Multi-Bit Error Tolerant Caches Using Two-Dimensional Error Coding," MICRO 2007, 40th Annual IEEE/ACM Int'l Symp on Microarchitecture, Dec. 2007 (197-209).

Kogge, et al., "Exascale Computing Study: Technology Challenges in Achieving Exascale Systems," DARPA report, Sep. 28, 2008 (297 pages).

Lam, Chung, "Cell Design Considerations for Phase Change Memory as a Universal Memory," IEEE Press, Proc. Int'l Symp VLSI Technology, Sys, and Apps, Apr. 2008 (2 pgs).

Lee, et al., "Architecting Phase Change Memory as a Scalable DRAM Alternative, "ISCA '09: Proc of the 36th Annual Int'l Symposium, Jun. 2009 (pp. 2-13).

Lewis, et al., "Architectural Evaluation of 3D Stacked RRAM Caches," IEEE, Press, Proc IEEE 3D System Integration Conference, 2009 (pp. 1-4), Sep. 2009.

Li, et al., "McPat: An Integrated Power, Area and Timing Modeling Framework for Multicore and Manycore Architectures," MICRO '09, Dec. 12-16, 2009 (12 pages).

Lim et al., "Understanding and Designing New Server Architectures for Emerging Warehouse-Computing Environments," Int'l Symp~Computer Architecture, 2008(12), Jun. 2008.

Lim, et al., "Disaggregated Memory for Expansion and Sharing in Blade Servers," ISCA, Jun. 20-24, 2009 (12 pages).

LSST, "Large Synoptic Survey Telescope," [retrieved from http://www.lsst.org/lsst on May 12, 2011] (1 page).

Lyman, et al., "How Much information?," Oct. 27, 2003. [accessed at http://www2.sims.berkeley.edu/research/projects/how-much-info-2003/] (1 page).

Ma, et al,, "A Translation System for Enabling Data Mining Applications on GPUs," ICS '09: Proc of the 23rd Int'l Conf on Supercomputing, 2009 (pp. 400-409), Jun. 2009.

Madan, et al., "Optimizing Communication and Capacity in a 3d Stacked Reconfigurable Cache Hierarchy," Mar. 2009 (pp. 262-274).

Markoff ~ "Remapping Computer Circuitry to Avert Impending Bottlenecks" ~ NY Times ~ Feb. 2011 ~ 4 pages.

(56) References Cited

OTHER PUBLICATIONS

Mayer, Marissa, "Innovation at Google: The Physics of Data," Talk at Xerox PARC, Aug. 2009 [accessed at http://www.parc.com/event/936/innovation-at-google.html] (2).

Meza, et al., "Lifecycle-Based Data Center Design," Proc, ASME International Mechanical Engineering Congress & Exposition, Sep. 21, 2010 (11 pages).

Niccolai "Oracle and Sun Launch High-End OLTP System," Techworld.com, Sep. 16, 2009, [retrieved from http//news.techworld.com/data-centre on Dec. 24, 2009] (4).

Ousterhout, et al., "The Case for RAMClouds: Scalable High-Performance Storage Entirely in Dram," SIGOPS Operating Systems Review, vol. 43, No. 4, Dec. 2009 (92-105).

Patterson, et al., "A Case for Intelligent Ram: Iram," IEEE Micro, 1997 (23 pages), Apr. 1997.

Puttaswamy, et al., "3D-Integrated SRAM Components for High-Performance Microprocessors," IEEE Transactions on Computers, Oct. 2009 (pp. 1369-1381).

Qureshi et al., "Scalable High Performance Main Memory System Using Phase-Change Memory, Technology," ISCA '09: Proc of the 36th Annual Int'l Symp ~ Jun. 2009 (24-33).

Qureshi, et al., "Enhancing Lifetime and Security of PCM-Based Main Memory with Start-Gap Wear Leveling," MICRO 42, Dec. 12-16, 2009 (10 pages).

Raja, et al., "Digital Logic Implementation in Memristor-Based Crossbars," ICCCAS 2009 Int'l Conf on Communications, Circuits and Systems, Jul. 2009 (pp. 939-943).

Ranganathan, "From Microprocessors to Nanostores: Rethinking System Building Blocks for the Data-Centric Era," HP Labs, IEEE Computer Society, Jan. 2011 (10 pages).

Ranger, et al., "Evaluating Mapreduce for Multi-Core and Multiprocessor Systems," HPCA '07: Proc of the 2007 IEEE 13th Int'l Symposium, 2007 (pp. 13-24).

Reddi, et al., "Web Search Using Small Cores: Quantifying the Price of Efficiency," Microsoft Tech Report MSR-TR-2009-105, Aug. 2009 (13 pages).

Riedel, et al., "Active Disks for Large-Scale Data Processing," Computer, Jun. 2001 (pp. 68-74).

Rivoire, et al., "Joulesort: A Balanced Energy-Efficiency Benchmark," SIGMOD '07: Proc of the Int'l Conf on Management of Data, 2007 (pp. 365-376), Jun. 2007.

Roberts et al., "Is Storage Hierarchy Dead? Co-located Compute-Storage NVRAM-Based Architectures for Data-Centric Workloads," HPL-2010-114, HP Labs Tech 2010 (21), Nov. 2010.

Roberts et al., "On-Chip Cache Device Scaling Limits and Effective Fault Repair Techniques in Future Nanoscale Technology," DSD '07~10th Euromicro Conf ~2007 (9), Aug. 2007.

Robinett, et al., "Computing with a Trillion Crummy Components," Communications of the ACM, vol. 50, 2007 (pp. 35-39), Sep. 2007.

Russo, et al., "Nonvolatile Memory Technologies: An Overview," Proc. Workshop Technology Architecture Interaction, 2010 (pp. 44-65).

Satish, et al., "Designing Efficient Sorting Algorithms for Manycore GPUs." IPDPS 2009, IEEE International Symposium on Parallel & Distributed Processing, 2009 (pp. 1-10), May 2009.

Seiler, et al., "Larrabee: A Many-Core x86 Architecture for Visual Computing," Micro, IEEE, Aug. 2008 (15 pages).

Shah, et al., "Data Dwarfs: Motivating a Coverage Set for Future Large Data Center Workloads," ACLD 10, Workshop Proceedings ~ Nov. 2010 (2 pages).

Stukov, et al., "The Missing Memristor Found," Nature, vol. 453, May 2008 (pp. 80-83).

Vantrease, et al., "Corona: System Implications of Emerging Nanophotonic Technology," ISCA '08. 35th International Symposium, Jun. 2008 (pp. 153-164).

Venkataraman et al., "Consistent and Durable Data Structures for Non-Volatile Byte-Addressable Memory," Fast '11, 2011 (15 pages), Feb. 2011.

Wilkerson, et al., "Trading Off Cache Capacity for Reliability to Enable Low Voltage Operation," ISCA '08: Proc of the 35th Int'l Symposium, 2008 (pp. 203-214), Jun. 2008.

Williams, R.S., "A Central Nervous System for the Earth," Harvard Business Rev., vol. 87, No. 2, 2009 (2 pages).

Winter, Richard. "Why Are Data Warehouses Growing So Fast?," Apr. 10, 2008 [available at http://www.b-eye-network.com/view/7188] (3 pages).

Wu, et al., "eNVy: A Non-Volatile, Main Memory Storage System," Proc. Int'l Conf. on Arch. Support for Prog. Lang. and Oper. Sys., Oct. 1994 (12 pages).

Wu, et al., "Hybrid Cache Architecture with Disparate Memory Technologies," ISCA '09. Proc of the 36th Annual International Symposium, Jun. 2009 (12 pages).

Xu, et al., "Exploring Power-Performance Tradeoffs in Database Systems," IEEE 26th International Conference on Data Engineering, Mar. 2010 (12 pages).

Yang, et al., "Formalizing Mapreduce with CSP," 17th IEEE international Conference an Workshops on Engineering of Computer Based Systems, Mar. 2010 (pp. 358-367).

Zhai, et al., "Energy Efficient Near-Threshold Chip Multi-Processing," ISLPED '07: Proceedings~2007 (pp. 32-37), Aug. 2007.

Zhang, et al., "An Active Storage System for High Performance Computing," AINA 2008, 22nd International Conference Mar. 2008 (pp. 644-651).

Zhang, et al., "Exploring Phase Change Memory and 3d Die-Stacking for Power/Therma Friendly, Fast and Durable Memory Architectures" Int'l Conf on Parallel Arch/Comp Tech, Dec. 2009 (12).

Zhou, et al., "A Durable and Energy Efficient Main Memory Using Phase Change Memory Technology," ISCA '09: Proceedings, Jun. 20-24, 2009 (pp. 14-23).

Zhou, et al., "Large-Scale Parallel Collaborative Filtering for the Netflix Prize," Algorithmic Aspects in Information and Management, 2008 (12 pages).

\* cited by examiner

MICRODISK BLADE SERVER SYSTEM

DUAL IN-LINE MEMORY MODULE (DIMM)
MULTI-MICRODISK DAUGHTER BOARD

3D STACK
MICRODISK

Performance / power improvements

Power breakdown for the old/new designs

DATA STORAGE APPARATUS AND METHODS

RELATED APPLICATIONS

This is an International Patent Cooperation Treaty patent application that claims the benefit of U.S. Provisional Patent Application No. 61/311,744, filed on Mar. 8, 2010, which is hereby incorporated herein by reference in its entirety.

BACKGROUND

Internet and network-based data centers use large quantities of servers to store network retrievable information for frequent access and long-term storage. Compared to traditional enterprise workloads (e.g., electronic resource planning (ERP), database, and web services), emerging data-centric workloads operate at larger scales (hundreds of thousands of physical and/or virtual servers) and on more diverse data (e.g., structured data, unstructured data, rich media data). These workloads leverage increasingly sophisticated processor-intensive (or compute-intensive) algorithms (e.g., dynamic complex cross-correlations from multiple data sources) to extract knowledge from data.

DETAILED DESCRIPTION

Figure 1:
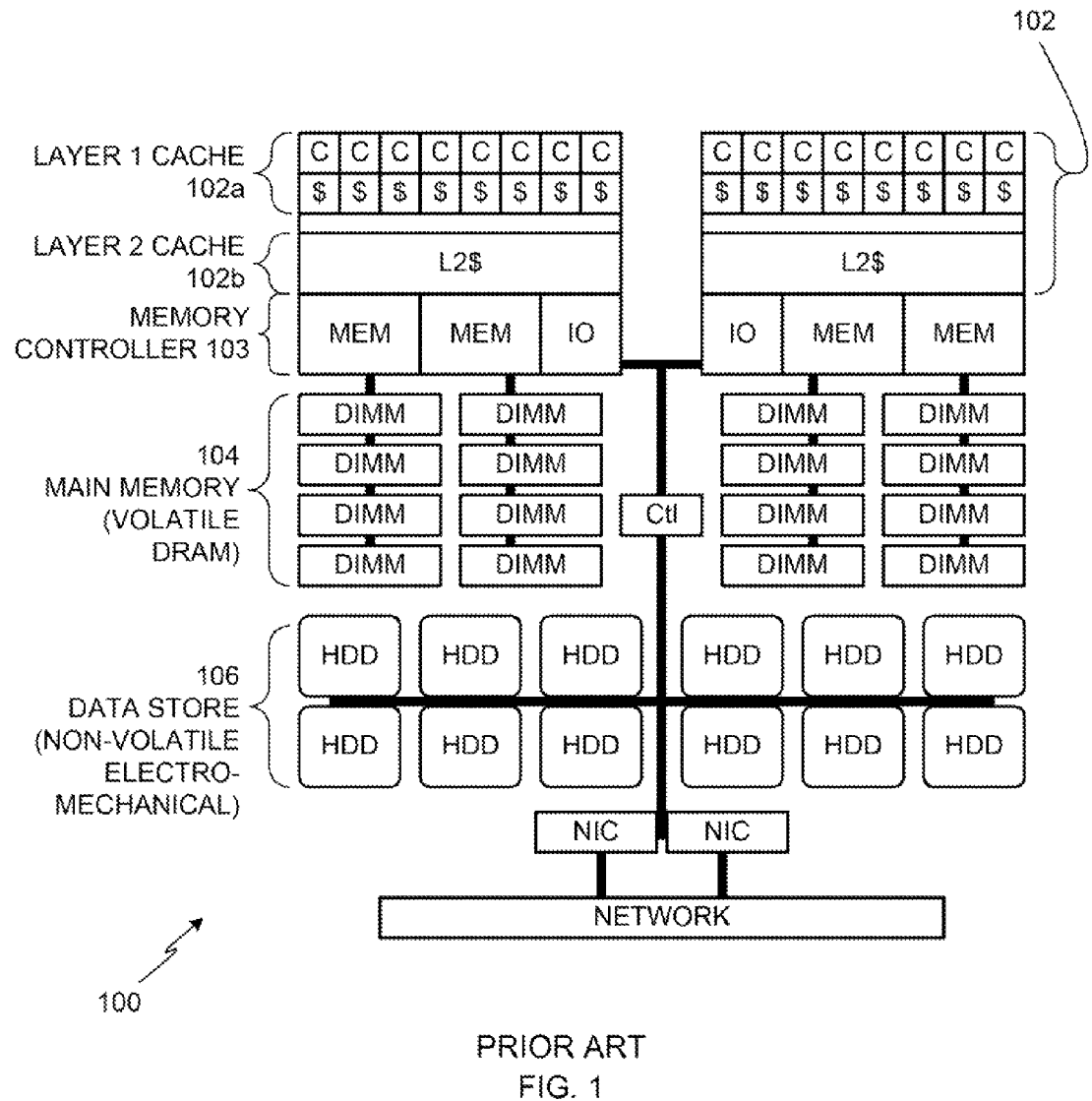
FIG. 1 depicts a known high-volume memory architecture for use in server-based storage applications.

Example methods, apparatus, and articles of manufacture disclosed herein can be used to implement high-volume, non-volatile data store devices that may be used in large-scale data store applications such as blade server systems. Example high-volume non-volatile data store devices disclosed herein are implemented using a reduced memory hierarchy relative to known high-volume data store devices by combining main memory areas with long-term data store areas using dual-use data stores. In addition, example high-volume non-volatile data store devices can be implemented to use no cache layers or relatively less cache layers than known high-volume non-volatile data storage technologies. Example methods, apparatus, and articles of manufacture are disclosed in connection with solid-state non-volatile high-speed data storage technologies such as, for example memristor memory technologies, flash memory technologies, and/or phase-change memory (PCRAM) technologies.

Known data centers typically employ a deep hierarchy of five or more data storage levels to obtain a cost effective solution in terms of capital, power, and cooling. For example, infrequently accessed data is archived onto tape. More frequently accessed data (such as database records) are stored on mechanical hard disk drives. Yet even more frequently accessed program variables and cached files are stored in main memory (e.g., cache memory or dynamic random access memory (DRAM)). Data warehouse workloads perform more external data movement (e.g., moving data between different data storage hierarchy levels) per operation than desktop workloads. Thus, a significant amount of time is spent on moving data through the entire length of data storage hierarchy levels.

Known architectures for implementing data centers have several drawbacks. For example, excessive material is required to duplicate data in multiple memory hierarchy levels and complex control circuits are required to manage those hierarchy levels. In addition, multiple levels of cache and memory add latency to accesses and, thus, traversing a multi-level hierarchy typically results in significant performance penalties. Also, a large quantity of hierarchy levels creates a significant energy penalty. That is, active energy is wasted at each memory boundary, and idle energy is wasted from cache leakage and DRAM refresh power. Current processor chips have many pins and expensive packages and sockets due to the need for wide off-chip memory and I/O buses.

Known data center architectures also exhibit drawbacks related to scaling and maintenance. For example, scaling is difficult due to memory limitations (e.g., most data has a high access latency on disk). Also, large numbers of heterogeneous components make it difficult to balance component count and capability. Known data center architectures have a static workload balance even when different applications generate a diverse set of workloads. Such known systems must be physically redesigned and rebalanced whenever there are changes in workload.

Known data center architectures also exhibit drawbacks related to reliability. Unexpected device failures of mechanical hard disks present data availability and/or integrity issues. In addition, data in volatile memories either has to also be stored in non-volatile storage (duplication) or must be rebuilt after power failures. Resilience to power failures for volatile memories is expensive in terms of cost, time, and energy, and ensuring such resilience adds to software complexity.

Unlike known data center architectures, example methods, apparatus, and articles of manufacture disclosed herein enable implementing high-volume data store devices (referred to herein as microdisks, which are also known as nanostores in some examples) having a flattened-level data storage hierarchy. The flattened-level data storage hierarchy collapses the boundary between main memory (e.g., used to store relatively more frequently accessed data) and data store areas (e.g., used to store relatively less frequently accessed data or long-term data) by providing each microdisk with a single-level high-volume data store that functions as both main memory and longer-term data store. In addition, the example methods, apparatus, and articles of manufacture enable using relatively shallow cache hierarchies (e.g., less cache levels than known data centers) or no cache levels while providing the same or better performance over known data center architectures. Example methods, apparatus, and articles of manufacture disclosed herein omit the use of electro-mechanical hard disks (e.g., magnetic storage disks) and, instead, employ high-volume solid state data storage technologies such as memristor, PCRAM, and/or flash to implement dual-use data store cells that operate as main memory and longer-term non-volatile data store areas. In this manner, data need not be duplicated across different data areas (e.g., there is no need to store data in a main memory data area for frequent access and duplicate the same data by storing it in a long-term data store area for relatively less frequently access) and problems with data availability and data integrity are reduced by decreasing or eliminating the number of moving parts associated with electro-mechanical hard disks and always storing data in non-volatile memory.

To enable efficient operation of each microdisk and more efficient use of network resources than known data center architectures, the example microdisks are each provided with a local processor that is highly local to and integrated with the data store of the microdisk. In this manner, each microdisk can implement relatively more autonomous control over its operations such that memory access requests over a network can be made to include relatively less control information from other external processors requesting data accesses (e.g., data write accesses or data read accesses).

In some example implementations, a flattened-level non-volatile data storage apparatus (e.g., a microdisk) is implemented by providing a non-volatile data store in communication with a local processor in the same package (e.g., a single-socket computing structure, a 3D stack chip, a memory board, a dual in-line memory module, etc.). The local processor and the non-volatile data store form a flattened-level non-volatile data storage system in which the local processor is closely coupled with the non-volatile data store. For example, in the flattened-level non-volatile data storage system, there is no volatile data storage (e.g., SDRAM or other volatile data storage) outside the local processor between the local processor and the non-volatile data store aside from any on-board local processor cache (e.g., processor-embedded cache) that the local process may have. In some example implementations, such a configuration in which the local processor (and any internal processor-embedded cache) is in communication with the non-volatile data store without any intermediary volatile data storage forms a single-level hierarchy. The local processor may be in communication with an external communication interface of the package to exchange communications with devices external from the package. The external communication interface can be configured to communicate with different types of communication interfaces (e.g., different memory controller interfaces, network interfaces, other memory interfaces, etc.) of the devices external from the package. The non-volatile data store can be implemented using a memristor data store, a phase-change random access memory, a flash memory, or any other suitable non-volatile data store. In some example implementations, the local processor can be frequency-scalable to provide different data access performance levels for accessing the non-volatile data store. In some example implementations, the flattened-level non-volatile data storage apparatus (e.g., a microdisk) is configured to be communicatively coupled to a storage server system (e.g., a blade server system and/or a daughter board thereof) having a plurality of other flattened-level non-volatile data storage devices (e.g., other microdisks) and the local processor can exchange information between its non-volatile data store and the other flattened-level non-volatile data storage devices. In addition, the local processor can exchange information between its non-volatile data store and network devices (e.g., client computers) external from the storage server system via, for example, a local area network (LAN) or a wide area network (WAN).

In some example implementations, example methods, apparatus, and articles of manufacture disclosed herein provide a hierarchy of additional computing elements (or processor elements) at increasing levels of distance from a non-volatile data store of a flattened-level non-volatile data storage apparatus (e.g., a microdisk). For example, a daughter board (e.g., a memory board for expanding the memory capacity of a data storage server) or a memory module (e.g., a dual in-line memory module) having a plurality of microdisks can also be provided with a compute element (e.g., a daughter board processor) forming a second-level compute hierarchy relative to the local processors of the microdisks. Such a second-level compute element can be configured to control, arbitrate, and/or monitor operations of its corresponding microdisks and/or to augment, offload, and/or directly participate in the computations associated with data residing on the microdisks. Further, when the daughter board or memory module is plugged into a server (e.g., a blade server), the server can have a third-level hierarchy compute element (e.g., a server processor) that, for example, controls, arbitrates, monitors, augments, offloads, and/or directly participates in the operations associated with its corresponding daughter boards or memory modules having their corresponding microdisks. In other example implementations, other manners of implementing multiple-level compute element hierarchies can also be used in connection with example methods, apparatus, and articles of manufacture disclosed herein.

In some examples, methods, apparatus, and articles of manufacture disclosed herein are used in large-scale data warehousing applications. The use and size of large-scale data warehousing applications continue to grow as network-based computing expands into different applications. Applications of such network-based computing include Internet-based data storage, network-community collaboration applications, social networking services, Internet multi-media streaming, etc. The known data storage techniques described above and other known data storage techniques exhibit several drawbacks (such as those described above) that render such solutions relatively inefficient in terms of power usage, physical space, and performance. Example methods, apparatus, and articles of manufacture disclosed herein overcome such inefficiencies by providing data storage solutions implemented using non-volatile solid-state data storage technologies with reduced (e.g., flattened) memory hierarchies that enable relatively more efficient power usage, relatively lower physical space requirements, and relatively higher data access performance than known data storage techniques.

Turning now to FIG. 1, a known data server 100 for use in a data center architecture includes several memory hierarchy levels. The memory hierarchy levels include a cache level 102 (having a layer 1 cache 102a and a layer 2 cache 102b, a memory controller level 103, a main memory 104, and a data store 106. The main memory 104 is used to store data that is frequently accessed (e.g., read and/or written) via a network 108. The data store 106 is used to store data for long-term non-volatile persistence. Typically, data frequently accessed in the main memory 104 is not immediately written through to the data store 106 due to the increased latencies involved in writing to and reading from the data store 106. However, at some point data from the main memory 104 is written into the data store 106 at which time data is duplicated in the main memory 104 and the data store 106, and sometimes the data is triplicated by also being stored in the cache 102.

As shown in FIG. 1, the main memory 104 is implemented using volatile dynamic random access memory (DRAM) and the data store 106 is implemented using non-volatile electro-mechanical memory (e.g., magnetic hard disk drives). Thus, in known systems such as the one depicted in FIG. 1, different memory technologies are used to implement main memory and data store areas. This is often due to the speed and cost of the different technologies. For example, while DRAM technology has relatively faster access times than magnetic hard disk drive technology, DRAM technology is also relatively more expensive per megabit (Mbit) than magnetic hard disk drive technology. Thus, the larger data store area required for the data store 106 is implemented using the cheaper (but slower) non-volatile electro-mechanical technology, while the faster main memory required to implement the main memory 104 is implemented with the faster (but more expensive) volatile DRAM technology.

Figure 2:
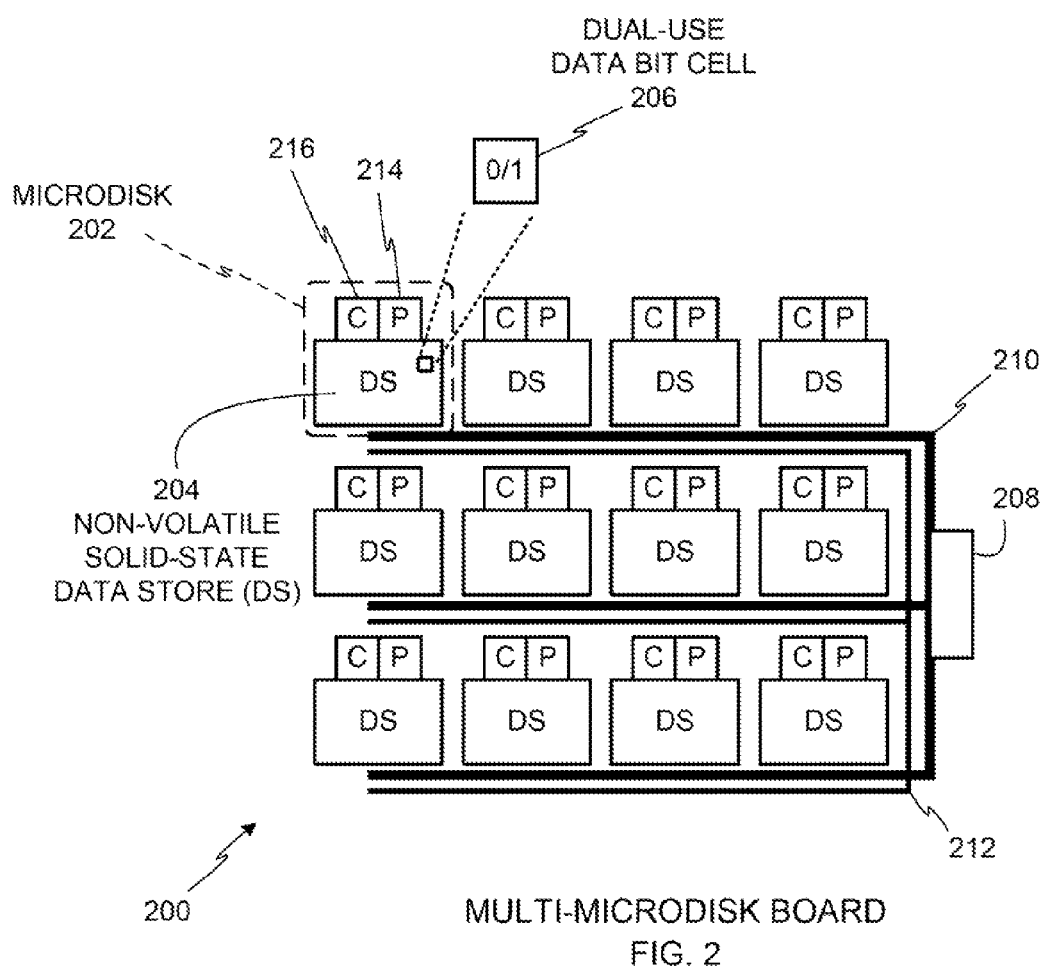
FIG. 2 depicts an example high-volume microdisk data store architecture implemented in accordance with the teachings disclosed herein.

Now turning to FIG. 2, an example multi-microdisk board 200 is shown in accordance with the example teachings disclosed herein. In the illustrated example, the multi-microdisk board 200 includes a plurality of microdisk devices, each of which is similar or identical to microdisk 202. In some examples, microdisks such as the microdisk 202 are also referred to as nanostores. The microdisk 202 (and each of the other microdisks of the multi-microdisk board 200) is a high-volume data storage device including a non-volatile solid-state data store 204 (e.g., the data store 204 can have up to or more than 100 gigabytes (GB) of storage capacity at 1 GB/s bandwidth accessibility). Unlike the known data server 100 of FIG. 1 which has the main memory 104 (for frequently accessed data) separate from the data store 106 (for long-term data storage), the microdisk 202 of FIG. 2 uses the data store 204 in a dual-use fashion to store both frequently accessed data and long-term data storage. That is, the microdisk 202 has a plurality of data bit cells (e.g., a data bit cell is capable of storing a single bit of data), each of which operates in dual-use fashion. For example, a bit value stored in an example dual-use data bit cell 206 can be retrieved from the dual-use data bit cell 206 as frequently accessed data and/or the bit value can remain stored (i.e., persist) in the dual-use data bit cell 206 in a non-volatile manner for relatively long durations (e.g., not frequently accessed and/or not frequently changed) without having to duplicate the bit value in a separate long term data store area. In this manner, the microdisk 202 of FIG. 2 achieves relatively higher efficiency in material use and physical space requirements by not requiring data storage areas for long term storage separate from data storage areas for frequently accessed data. This also reduces the power footprint for data storage over known data store architectures by not needing to power two separate data storage areas (e.g., the main memory 104 and the data store 106 of FIG. 1) that often store duplicate data.

In the illustrative example of FIG. 2, the data store 204 is implemented using a homogeneous data storage technology (e.g., a single IC die or one or more stacked IC die implemented using wholly memristor technology, wholly PCRAM technology, wholly flash technology, or wholly implemented using any other suitable memory technology), unlike the known data server 100 of FIG. 1 which is implemented using a heterogeneous memory combination (e.g., SDRAM for the main memory 104 and electro-mechanical hard disk drive for long-term data storage). The homogeneous data storage technology of the data store 204 enables the microdisk 202 to have relatively less memory interface circuits than known data server technologies, which require a different type of memory interface for a main memory 104 technology (e.g., an SDRAM interface and timing circuit for SDRAM memory) and a data store 106 technology (e.g., a hard disk drive interface for electro-mechanical hard disk memory). The reduced memory interface circuits of the microdisk 202 enable lower power consumption and lower data access latencies (thus, increasing data access performance).

In some example implementations such as the illustrated example of FIG. 2, the microdisks 202 are in communication with a network interface 208 via a network bus 210. Also, in the same or other example implementations, the microdisks 202 are in communication with one another via a disk-to-disk communication bus 212. In some example implementations, the disk-to-disk communication bus 212 can operate at the same internal frequency (e.g., 1 GB/s) of each microdisk 202. The microdisks 202 receive data access requests from requesting network devices (not shown) and communicate data to the requesting network devices via the network interface 208. Such network devices may be client computers in communication with the microdisk 202 (or a server containing the microdisk 202) via a local network or a wide area network (e.g., the Internet or a private network).

In the illustrated example of FIG. 2, the microdisk 202 is provided with a local processor 214 in communication with the data store 204. The local processor 214 enables the microdisk 202 to operate with relatively more autonomy than the main memory and data store areas of known data server solutions (e.g., the main memory 104 and the data store 106 of FIG. 1). By providing compute logic, such as the local processor 214, in a tightly or closely integrated manner with a data store (e.g., the data store 204), the compute logic in a microdisk can generate and process timing and data access operations specific to the memory technology in the microdisk in response to data access requests received via a network. In this manner, network communications associated with data accesses to the microdisk 202 can use network resources in a relatively more efficient manner by reducing the need for such network communications to carry large amounts of memory-control signals or commands associated with specific features, capabilities, or memory timing requirements of different memory technologies. In addition, network devices that request data accesses need not be concerned or aware of the particular data storage technologies used in the multi-microdisk board 200. Also, providing compute logic such as the local processor 214 to each microdisk 202 enables mixing microdisks of different memory technologies onto the same multi-microdisk board (e.g., the multi-microdisk board 200) because the local processor of each microdisk can initiate and perform its own data access operations using timings particular to its memory technology.

The local processor (e.g., the local processor 214) of each microdisk of the multi-microdisk board 200 also enables dynamically balancing workloads among the different microdisks. For example, the local processors 214 of the microdisks 202 can communicate with one another via the disk-to-disk communication bus 212 and use such communications to balance workloads among the different microdisks 202 (e.g., by performing microdisk-to-microdisk data transfers to off-load data between different microdisks).

In the illustrated example, the local processor 214 is a cache-coherent and multi-threading processor to process multiple data access and/or data maintenance requests substantially simultaneously. In addition, the local processor 214 may be implemented to support frequency and voltage scaling (e.g., scaling within a frequency range of 100 MHz to 1 GHz or beyond).

In some example implementations, the local processor 214 may be implemented on a separate integrated circuit die from the data store 204 and communicatively coupled to the data store 204 die (e.g., via optical or electrical through-silicon vias (TSVs), via optical or electrical wire bonding, or via optical or electrical board-level external IC package interconnect), while in other example implementations the local processor 214 may be integrally formed on the same integrated circuit die as the data store 204. Although only a single local processor 214 is shown in each microdisk 202, each microdisk 202 may alternatively be provided with multiple processors or multiple processor cores (each of which may have multi-threading processing capabilities). For example, in example implementations in which the microdisk 202 is implemented using two or more stacked non-volatile data store die, a separate processor or processor core can be integrally formed into each data store die to process data access requests and perform data accesses and memory maintenance processes corresponding to its data store die.

In the illustrated example, the microdisk 202 is also provided with a cache 216 having a relatively lower access latency than the data store 204. The cache 216 may include one or more cache layers (e.g., cache layers 604a-c of FIG. 6). For example, in example implementations in which the local processor 214 is sufficiently slow that performance is not greatly affected by the latency or bandwidth of the data store 204, the cache 216 can be implemented with only one level of cache, which may be a private cache or a shared cache. In some example implementations, the cache 216 may be provided with multiple cache layers, each of which may be individually and dynamically enabled (e.g., powered on) or disabled and bypassed (e.g., powered off or gated off) on an as-needed basis. Such dynamic enabling/disabling of individual cache layers may be advantageously used when memory clocks are changed to provide different memory access performance. For example, when a memory access clock is sufficiently downscaled such that the access latency of the data store 204 will minimally affect or not affect performance, all of the cache layers of the cache 216 may be disabled and bypassed such that the local processor 214 can access the data store 204 directly. To disable one or more cache layers (e.g., one or more of the cache layers 604a-c of FIG. 6) and remove or gate-off power delivery to the cache layer(s), a write-back process is used to write back dirty data from the cache layer(s) to the data store 204 prior to fully powering off the cache layer(s). In addition, disabled (and, thus, powered-off) cache layer(s) are not used for storing new data until they are re-enabled (and, thus, powered-on). As the memory access clock is scaled higher, one or more cache layers of the cache 216 can be selectively enabled to, for example, maintain an acceptable memory access performance associated with the corresponding microdisk 202.

In some examples, one or more cache layers of the cache 216 can be dynamically enabled or dynamically disabled based on a rate of write access requests received by the microdisk 202. Example techniques disclosed herein can use the rate of write accesses to preserve reliability and useful life of non-volatile data stores such as the non-volatile data store 204. That is, the non-volatile data store 204 of the illustrated example has a write endurance property that is indicative of a quantity of write cycles that can be endured by a single data bit cell (e.g., the dual-use data bit cell 206) while guaranteeing reliability of the data stored therein. For example, non-volatile flash memories of different technology types can have write endurances ranging from five thousand (5 k) to one million (1 M) write cycles. After a non-volatile memory has exceeded its rated write endurance threshold, data stored therein can no longer be relied upon as being accurate.

To preserve a write endurance property of the non-volatile data store 204 of the illustrated example and, thus, increase the useable life of the microdisk 202, examples disclosed herein can use a write access rate threshold and/or a write-to-read ratio threshold. A write access rate threshold is indicative of a rate of write accesses per second (or per any other time unit, e.g., millisecond, minute, etc.) that, when exceeded, causes the local processor 214 to dynamically enable one or more cache layers of the cache 216. When a monitored write access rate of the microdisk 202 falls below the write access rate threshold, the local processor 214 can disable the one or more cache layers 216.

A write-to-read ratio threshold is indicative of a ratio of write accesses to read accesses over a particular duration. In some examples, when a measured write-to-read ratio of the microdisk 202 falls below the write-to-read ratio threshold, the local processor 214 can dynamically disable one or more cache layers of the cache 216 based on recent accesses to the non-volatile data store 204 having had relatively fewer write requests. When the measured write-to-read ratio of the microdisk 202 exceeds the write-to-read ratio threshold, the local processor 214 can dynamically enable the one or more cache layers of the cache 216 based on recent accesses to the non-volatile data store 204 having had relatively more write requests than desired.

Monitoring write access rates and/or write-to-read ratios and dynamically enabling cache layer(s) based on these monitored values during operations of the microdisk 202 enables protecting the non-volatile data store 204 from enduring or being subject to quantities of writes that could otherwise deteriorate or decrease the reliability and life of the storage cells (e.g., the dual-use data bit cell 206) of the non-volatile data store 204. That is, when one or more cache layers are enabled, writes are initially performed to the cache layer(s) instead of to the non-volatile data store 204. Eventually or subsequently, write-through operations can be used to write-through to the non-volatile data store 204 any cached data that is deemed to be relatively longer term, while shorter term (e.g., frequently changing) cached data may not be written through to the non-volatile data store 204. In this manner, examples disclosed herein can be used to prevent frequently changing data from thrashing non-volatile data stores and, thus, protect the write endurance properties of non-volatile data stores such as the non-volatile data store 204.

In some examples, multiple write access rate thresholds and/or multiple write-to-read ratio thresholds can be defined to selectively enable/disable different cache layers in the cache 216 based on which thresholds have or have not been exceeded. For example, in a three-layer cache design, a first write access rate threshold (or a first write-to-read ratio threshold) may be used to control when to enable/disable a first cache layer, a second write access rate threshold (or a second write-to-read ratio threshold) may be used to control when to enable/disable a second cache layer, and a third write access rate threshold (or a third write-to-read ratio threshold) may be used to control when to enable/disable a third cache layer.

In some examples, threshold hysteresis techniques may be used to avoid repeatedly enabling and disabling cache layers in chaotic oscillating fashions. Some example threshold hysteresis techniques involve enabling or disabling one or more cache layers for a threshold duration before reconsidering whether to subsequently change the enable or disable state(s) of the one or more cache layers. In such example threshold hysteresis techniques, historical data access types (e.g., read or write access types) are monitored and tallied using respective read and write counts over a duration of time. The local processor 214 can then analyze the historical access type information (e.g., based on one or more write access rate threshold(s) and/or one or more write-to-read ratio threshold(s)) to disable/enable one or more cache layers for a subsequent amount of time, which may be equal to the previous duration during which the historical access type information was collected. The process can then be repeated to collect another set of historical access type information to subsequently re-evaluate when the enable or disable state(s) of the one or more cache layers should be changed.

Other example threshold hysteresis techniques involve enabling one or more cache layers based on a first threshold (e.g., based on exceeding a write access rate first threshold or a write-to-read first threshold) and disabling the cache layers based on a second threshold (e.g., based on falling below a write access rate second threshold or a write-to-read second threshold).

In examples using threshold hysteresis techniques as discussed above, the enable or disable state of a cache layer remains the same for a plurality of subsequent data accesses rather than changing the enable/disable state or re-evaluating the enable/disable state of the cache layer on a per-access basis. In this manner, since a plurality of subsequent data accesses do not rely on cached data, cache layers can be disabled by removing or gating-off power from being delivered to the cache layers for extended durations with little or no performance degradation resulting from the erasure of contents (e.g., losing contents) from the disabled cache layers. The plurality of subsequent data accesses following a change in the enable or disable state of a cache layer can include a plurality of single read accesses, a plurality of single write accesses, a plurality of burst mode accesses (in which data at several data locations is accessed based on a single request), and/or any combination of one or more single read accesses, one or more single write accesses, and/or one or more burst mode accesses.

Dynamically disabling cache layers as discussed above can be advantageously used in streaming applications, media decoding applications, or any other applications that continuously, consecutively, pseudo-continuously, pseudo-consecutively, or sporadically read vast quantities of data to accomplish a particular task, operation, or process. Because read accesses do not significantly degrade the write endurance property of a non-volatile memory such as the non-volatile data store 204 of FIG. 2, read operations can be allowed directly to the non-volatile data store 204 without using the cache 216. As access patterns change to be predominantly write operations, re-evaluating the enable/disable state of the cache layers can lead to enabling one or more cache layers of the cache 216 to prevent or reduce excessive write accesses to the non-volatile data store 204 during periods of high-rate or high-volume write operations.

In the illustrated examples disclosed herein, each microdisk in a server system (e.g., the microdisk blade server 300 of FIG. 3) can selectively enable a quantity of cache layers independent of quantities of cache layers enabled by others of the microdisks in the server system. In this manner, each microdisk can optimize its power usage efficiency and/or performance independent of other microdisks.

Figure 3:
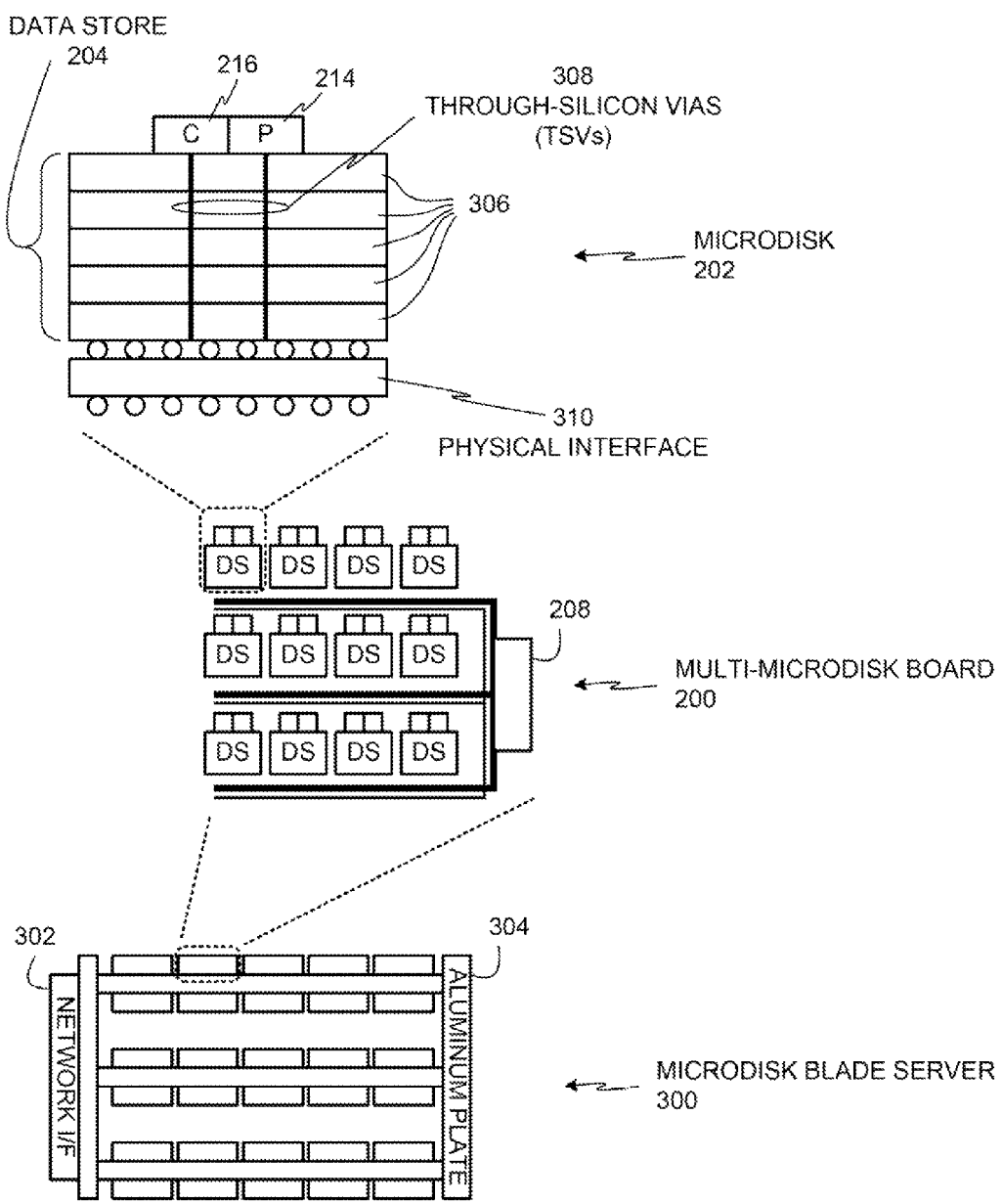
FIG. 3 depicts an example high-volume microdisk blade server implemented in accordance with the teachings disclosed herein.
Figure 4:
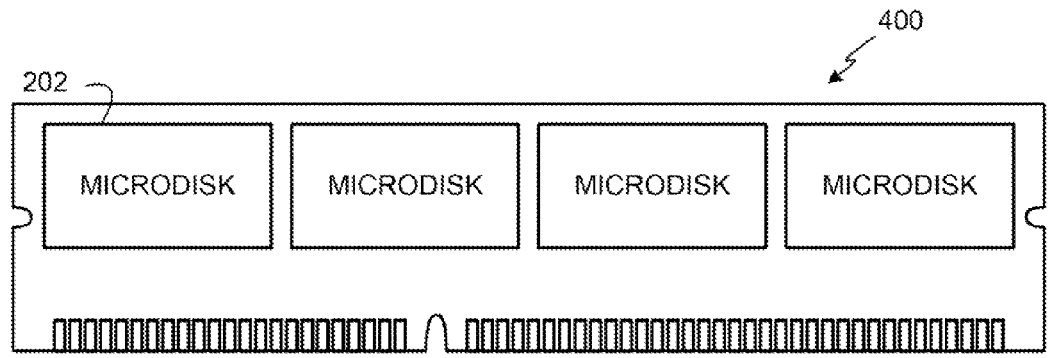
FIG. 4 is an example dual in-line memory module that may be used to implement the example multi-microdisk board of FIGS. 2 and 3.

FIG. 3 depicts an example high-volume microdisk blade server 300 that is implemented using the multi-microdisk board 200 and microdisk 202 of FIG. 2. In the illustrated example of FIG. 3, the multi-microdisk board 200 is implemented as a daughter board that plugs into or connects to a physical socket (not shown) of the microdisk blade server 300 via the network interface 208 of the multi-microdisk board 200. In some example implementations, a dual in-line memory module 400 as shown in FIG. 4 can be used to implement the multi-microdisk board 200. The connection between the multi-microdisk board 200 and the microdisk blade server 300 can be electrical or optical.

The microdisk blade server 300 includes a plurality of other multi-microdisk boards substantially similar or identical to the multi-microdisk board 200, and each of the multi-microdisk boards is plugged into or connected to a respective optical or electrical physical socket of the microdisk server 300. In this manner, a single multi-microdisk board socket on the microdisk blade server 300 enables interfacing the microdisk blade server 300 with multiple microdisks (e.g., multiple instances of the microdisk 202). Thus, expanding data store capacity of the microdisk blade server 300 can be performed either by plugging in additional microdisks (e.g., the microdisk 202) into a multi-microdisk board (e.g., the multi-microdisk board 200) or adding additional multi-microdisk boards (e.g., substantially similar or identical to the multi-microdisk board 200) to the microdisk server 300.

The microdisk blade server 300 includes a network that optically or electrically connects all of the multi-microdisk boards (e.g., the multi-microdisk board 200) to one another and to an external network via a network interface 302. In some example implementations, the network of the microdisk blade server 300 can be implemented using a fat tree topology to connect the ensemble of multi-microdisk boards and provide full bisection bandwidth.

The microdisk blade server 300 can be provided with an aggregate cooling system thermally coupled to each connected multi-microdisk board (e.g., the multi-microdisk board 200) and an aluminum plate 304 to dissipate heat away from each multi-microdisk board.

The microdisks 202 can be either soldered to the multi-microdisk board 200 or connected via sockets on the multi-microdisk board 200. The interconnections can be optical or electrical. In the illustrated example, the on-board bandwidth of the multi-microdisk board 200 to each microdisk 202 is relatively low to enable reducing wire count and simplifying signal routing. In some example implementations, the microdisks 202 can be clustered on the multi-microdisk board 200 for fast, high-bandwidth communications within the clusters and slower global communications. The multi-microdisk board 200 can be provided with cluster-to-cluster links to enable inter-cluster communications and cluster-to-network interface communications.

Figure 5:
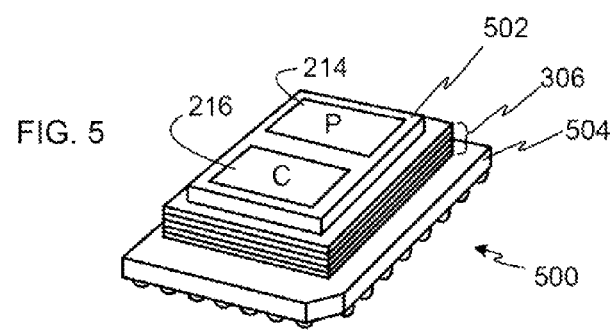
FIG. 5 is an example three-dimensional (3D) stack structure that may be used to implement the example microdisks of FIGS. 2 and 3 in accordance with the example methods and apparatus disclosed herein.

In the illustrated example of FIG. 3, the microdisk 202 is shown as a 3D die stack in which the data store 204 is formed of multiple stacked IC dies 306, and the local processor 214 and cache 216 are connected to each of the stacked IC dies 306 using electrical or optical through-silicon vias (TSVs) 308. Turning briefly to FIG. 5, an isometric view is shown of the microdisk 202 in an example 3D stack chip configuration 500. In the illustrated example of FIG. 5, an upper die 502 includes the local processor 214 and the cache 216 formed thereon. The upper die 502 is stacked on the data store IC die 306, which is stacked on a package substrate 504. Thus, in the illustrated example, the local processor 214 and the cache 216 are formed on the same silicon layer (e.g., the upper die 502) and the non-volatile data store 204 is formed on one or more silicon layers (e.g., the stacked IC dies 306) separate from the silicon layer containing the local processor 214 and the cache 216. In the illustrated example, the package substrate 504 includes a ball grid array (BGA) interface; however, any other type of packaging may be used.

Returning to the illustrated example of FIG. 3, the microdisk 202 is provided with a physical interface 310 that interfaces the microdisk 202 with external circuits (e.g., the multi-microdisk board 200). The physical interface 310 may be implemented using an optical connector or an electrical connector. In the illustrated example, the physical interface 310 interfaces the microdisk 202 with one or more power supply lines, a clock signal, and a data communication interface. In some example implementations, a PCI-express interface can be used to interface the microdisk 202 with the multi-microdisk board 200. In some example implementations, the physical interface 310 may be a chip package interface (e.g., the BGA interface of the package substrate 504 of FIG. 5) and the microdisk 202 may be soldered onto the multi-microdisk board 202. In other example implementations, the physical interface 310 may be a socket interface such that the microdisk 202 may be removably plugged into the multi-microdisk board 202.

Figure 6:
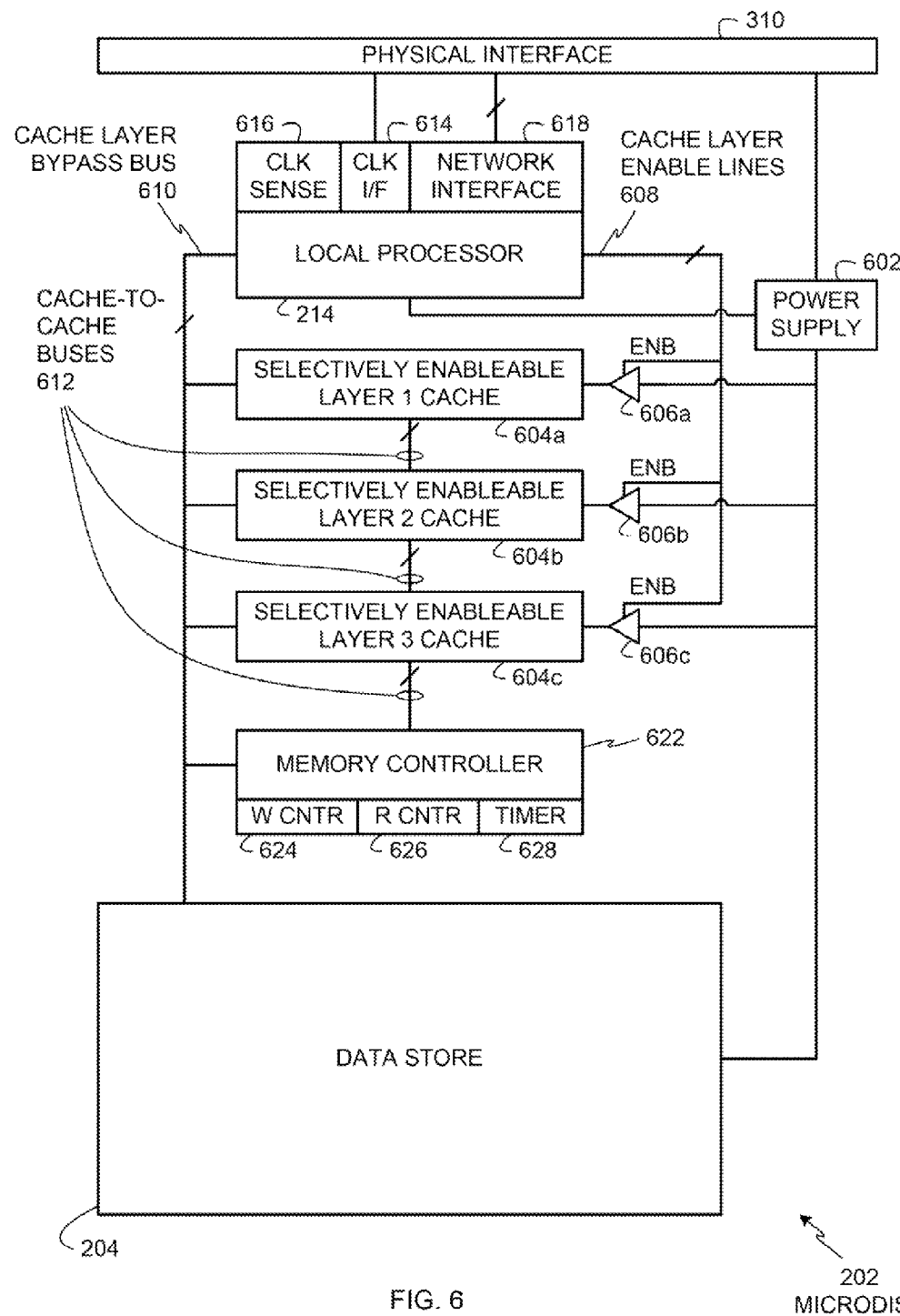
FIG. 6 is a detailed diagram of an example microdisk of FIGS. 2-5.

FIG. 6 is an example detailed diagram of the microdisk 202 of FIGS. 2-5. The different portions of the example microdisk 202 described below can be implemented as integrated circuits within a single IC die or as integrated circuits within separate IC die. Additionally or alternatively, the microdisk 202 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the microdisk 202 may be implemented as any combination(s) of any of the foregoing techniques, for example, any combination of firmware, software, discrete logic and/or hardware. Although the microdisk 202 is described below in connection with the diagram of FIG. 6, other example implementations may include additional and/or alternative structures. For example, some of the portions of the microdisk 202 depicted in FIG. 6 may be eliminated or combined with other portions.

Turning in detail to FIG. 6, the microdisk 202 is provided with the data store 204 and the local processor 214. As discussed above, the data store 204 can be implemented using one or more IC die 306 (FIGS. 3 and 4). Thus, in some example implementations, the data store 204 may be implemented on one or more IC die separate from the local processor 214 and the other portions of the microdisk 202 shown in FIG. 6. Alternatively, the data store 204, the local processor 214 and the other portions of the microdisk 202 may be formed on the same IC die.

To provide power to the different portions (or subsystems) of the microdisk 202, the microdisk 202 is provided with a power supply 602. The power supply 602 can receive auxiliary power from the physical interface 310 and regulate the power for delivery to the different portions of the microdisk 202. In example implementations in which the microdisk 202 is implemented using a 3D stack such as the 3D stack chip 500 of FIG. 5, the power supply 602 can be provided on a single die (e.g., the upper die 502 of FIG. 5), and the power supply 602 can deliver power to circuits in its die and to the other dies (e.g., the data store IC die 306 shown in FIGS. 3 and 5) of the 3D stack chip 500 using TSVs (e.g., the TSVs 308 of FIG. 3).

To enable different levels of memory access performance, the microdisk 202 is provided with multiple cache layers, each of which may be selectively and separately enabled and/or selectively and separately disabled. Three such cache layers are shown in FIG. 6 as a selectively enableable layer 1 cache 604a, a selectively enableable layer 2 cache 604b, and a selectively enableable layer 3 cache 604c. In the illustrated example, the selectively enableable cache layers 604a-604c form the cache 216 of FIGS. 2, 3, and 5. The selectively and/or dynamically enableable/disableable capabilities of the cache layers 604a-c enable configuring the microdisk 202 as a hierarchically flattenable non-volatile data storage device. In such a hierarchically flattenable architecture, each of the cache layers 604a-c can be incrementally disabled to incrementally flatten or decrease the memory hierarchy between the local processor 214 and the non-volatile data store 204. When all of the cache layers 604a-c are disabled, the memory hierarchy between the local processor 214 and the non-volatile data store 204 is completely flattened such that the local processor 214 can bypass the cache layers 604a-c and access the non-volatile data store directly 204 (through a memory controller 622) without using the cache layers 604a-c.

In the illustrated examples disclosed herein, each microdisk (e.g., the microdisk 202) in a server system (e.g., the microdisk blade server 300 of FIG. 3) can have a selectively enabled set of cache layers (e.g., the selectively enableable cache layers 604a-c) independent of the set(s) of cache layers enabled in others of the microdisks in the server system. For instance, a first microdisk may have one cache layer enabled, while a second microdisk may have two cache layers enabled. In this manner, the power usage efficiency of each microdisk can be optimized based on its data storage/access usage independent of other microdisks. In some example implementations, the selectively enableable cache layers 604a-604c can be selectively enabled/disabled during design time or fabrication time, while in other example implementations, the selectively enableable cache layers 604a-604c can be selectively enabled/disabled during runtime and/or during design time or fabrication time.

To selectively and independently enable the selectively enableable cache layers 604a-604c, the microdisk 202 is provided with gate drivers 606a-c, each of which is connected to a respective one of the selectively enableable cache layers 604a-604c. In addition, the microdisk 202 is provided with cache layer enable lines 608 connected between the local processor 214 and enable inputs of the gate drivers 606a-c. In this manner, the local processor 214 can selectively enable any of the selectively enableable cache layers 604a-c by enabling respective ones of the gate drivers 606a-c to allow power delivery from the power supply 602 to the selected ones of the selectively enableable cache layers 604a-c.

To enable bypassing non-enabled ones of the selectively enableable cache layers 604a-c, the microdisk 202 is provided with a cache layer bypass bus 610. In some example implementations in which none of the selectively enableable cache layers 604a-c are enabled, the cache layer bypass bus 610 operates as a direct connection between the local processor 214 and the data store 204 (via the memory controller 622) so that data accesses can be performed on the data store 204 without any intervening cache operations (and operate with the cache powered off, if desired). When one or more of the selectively enableable cache layers 604a-c is (are) enabled, the cache layer bypass bus 610 allows bypassing the disabled cache layers while performing memory accesses via the intervening one or more enabled ones of the selectively enableable cache layers 604a-c.

In addition, to allow cache-to-cache data flows, the microdisk 202 is provided with cache-to-cache buses 612 between adjacent ones of the selectively enableable cache layers 604a-c. When one of the selectively enableable cache layers 604a-c is disabled, the corresponding one of the cache-to-cache buses 612 is idle. Power may or may not be maintained on the cache bus 612 depending on the amount of startup latency acceptable in a particular application.

In the illustrated example, the local processor 214 determines when to enable or disable individual ones and/or sets of the selectively enableable cache layers 604a-c based on the frequency of its memory access clock used to access the data store 204. That is, the local processor 214 (or other logic in the microdisk 202) can upscale or downscale the frequency of a clock signal received via a clock interface 614 from, for example, the microdisk server 300. The frequency scaling can be based on, for example, the workload or usage of the microdisk 202. To detect the frequency of the locally scaled clock signal, the microdisk 202 is provided with a clock sense 616. In some examples, when the clock sense 616 detects that the memory access clock frequency is sufficiently slow (e.g., below a pre-defined threshold) such that performance is not greatly affected by the latency or bandwidth of the data store 204, the local processor 214 may enable only the layer 1 cache 604a or can disable all of the selectively enableable cache layers 604a-c. As the memory access clock is scaled higher, the local processor 214 may enable one or more of the selectively enableable cache layers 604a-c to, for example, maintain an acceptable memory access performance associated with the microdisk 202.

To exchange data with requesting devices (e.g., network devices or other microdisks) and to receive data access requests, the microdisk 202 is provided with a network interface 618.

To process access requests (e.g., read and write access requests) to the non-volatile data store 204, the microdisk 202 is provided with the memory controller 622. That is, when the local processor 214 is to access the non-volatile data store 204 (e.g., the cache layers 604a-c are disabled or a cache miss occurs), the local processor 214 sends a data access request to the memory controller 622. The memory controller 622 processes the data access request to write one or more data (e.g., a single write access or a burst mode write access) to the non-volatile data store 204 or to read one or more data (e.g., a single read access or a burst mode read access). For read accesses, the memory controller 622 returns requested data to the local processor 214 via the cache-to-cache buses 612. In the illustrated example, the memory controller 622 is located in the same silicon layer (e.g., the upper die 502) as the local processor 214 and the cache layers 604a-604c.

To generate, track, aggregate, or tally historical occurrences of different historical data access types (e.g., read access types and/or write access types) over a duration of interest, the microdisk 202 of the illustrated example is provided with a write counter ('W CNTR') 624, a read counter ('R CNTR') 626, and a timer 628. In the illustrated example, the write counter 624, the read counter 626, and the timer 628 are located in the memory controller 622. However, the write counter 624, the read counter 626, and the timer 628 may be located anywhere else in the microdisk 202.

In operation, when the memory controller 622 receives a write request, it increments the write counter 624. When the memory controller 622 receives a read request, it increments the read counter 626. In some examples, the memory controller 622 increments the counters 624 and 626 by a quantity of datum requested to be accessed in corresponding write or read requests. For example, for a single read access request, the memory controller 622 increments the read counter 626 by one. However, if a burst mode read access is requested, the memory controller 622 increments the read counter 626 by a quantity of datum requested in the burst mode read access request. In such examples, the memory controller 622 increments the write counter 624 in similar fashion based on the quantity of data accesses requested in each write access request. In other examples, the memory controller 622 increments the counters 624 and 626 by one regardless of whether data access requests are single data access requests or burst mode accesses.

In some examples in which the microdisk 202 uses a write access rate measure to evaluate whether to enable/disable one or more of the cache layers 604a-c instead of using a write-to-read ratio measure, the read counter 626 may be omitted.

In the illustrated example, the memory controller 622 uses the timer 628 to track a duration over which historical data access requests are tracked using the counters 624 and 626 before re-evaluating on whether to change the disable or enable state(s) of one or more of the cache layers 604a-c. In some examples, the duration tracked using the timer 628 may be set at fabrication time of the microdisk 202 and/or may be a setting that is adjustable through software or firmware during operation of the microdisk 202. The duration may be based on the type(s) of application(s) that will be accessing data in the microdisk 202 and/or the type(s) of use(s) of the microdisk 202. For example, if the microdisk 202 is to be used primarily for working document data in which information is frequently updated (e.g., the microdisk 202 will be subject to relatively high rates of write accesses or relatively high write-to-read ratios), the duration can be set to be relatively short. If the microdisk 202 is to be used primarily for archiving and streaming media (e.g., the microdisk 202 will be subject to relatively low rates of write accesses or relatively low write-to-read ratios), the duration can be set to be relatively long.

Figure 7:
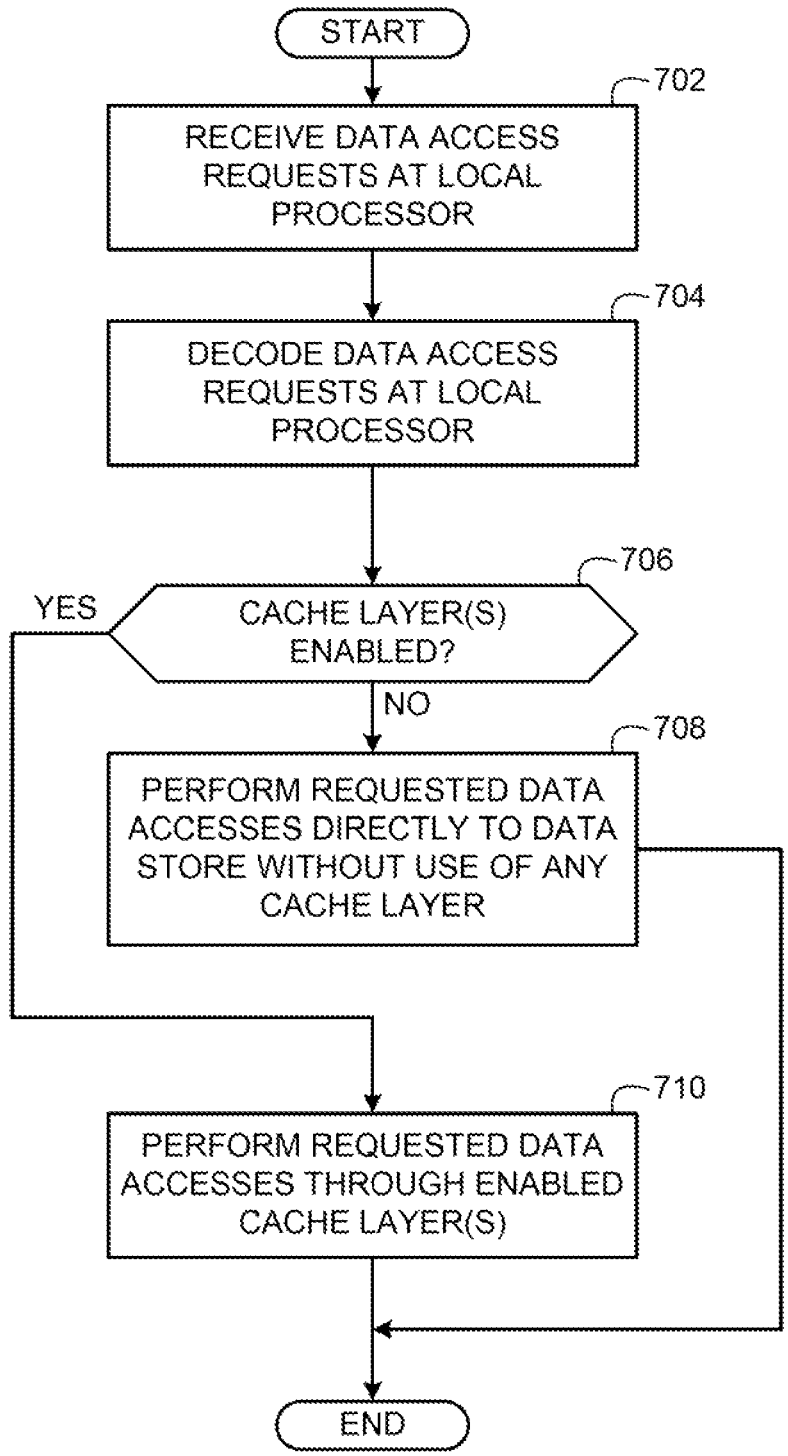
FIG. 7 depicts a flow diagram of an example process that can be used to access data in the microdisk of FIGS. 2-6.
Figure 8:
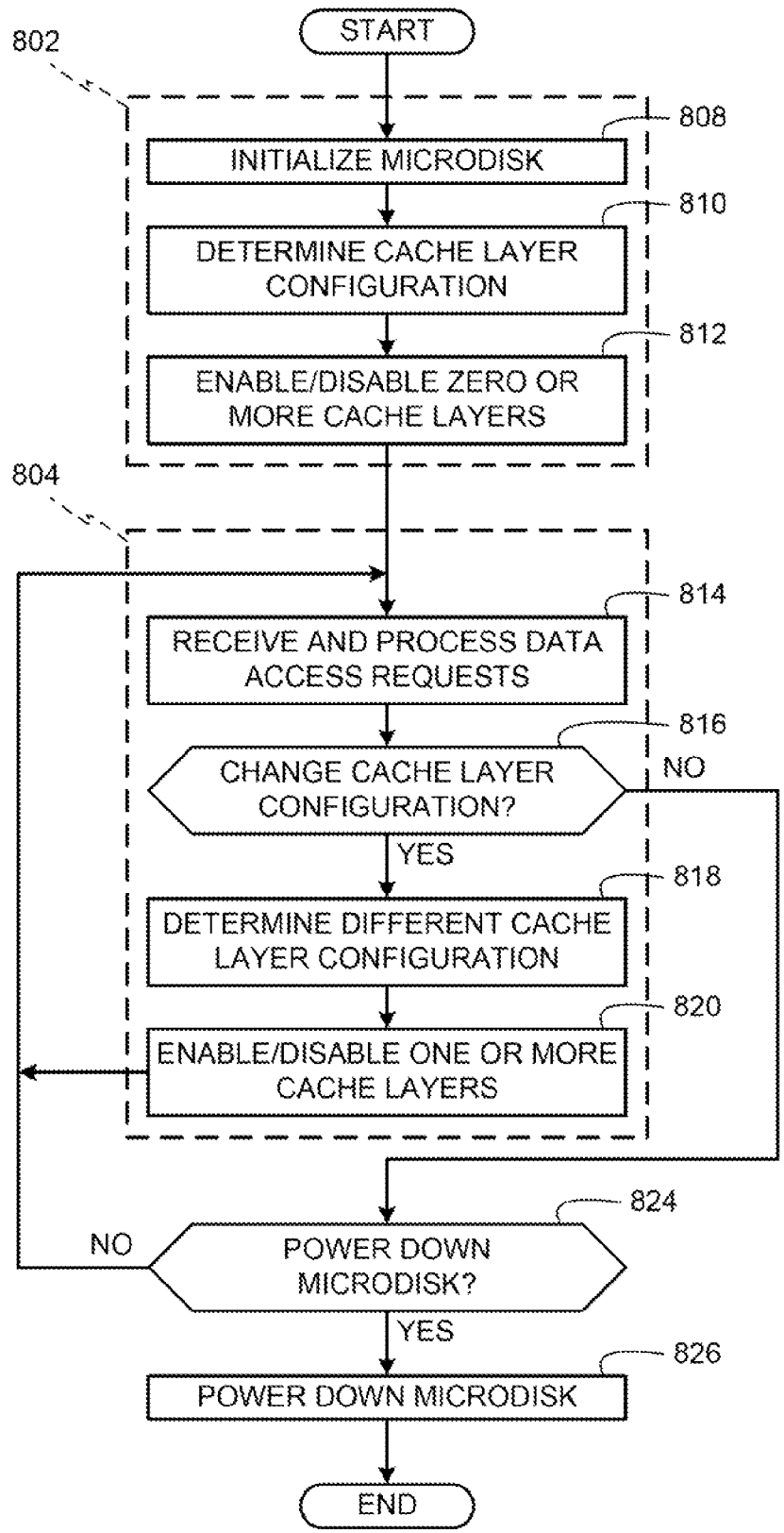
FIG. 8 depicts a flow diagram of an example process that can be used to selectively enable and/or disable different cache layers in the microdisk of FIGS. 2-6.
Figure 9:
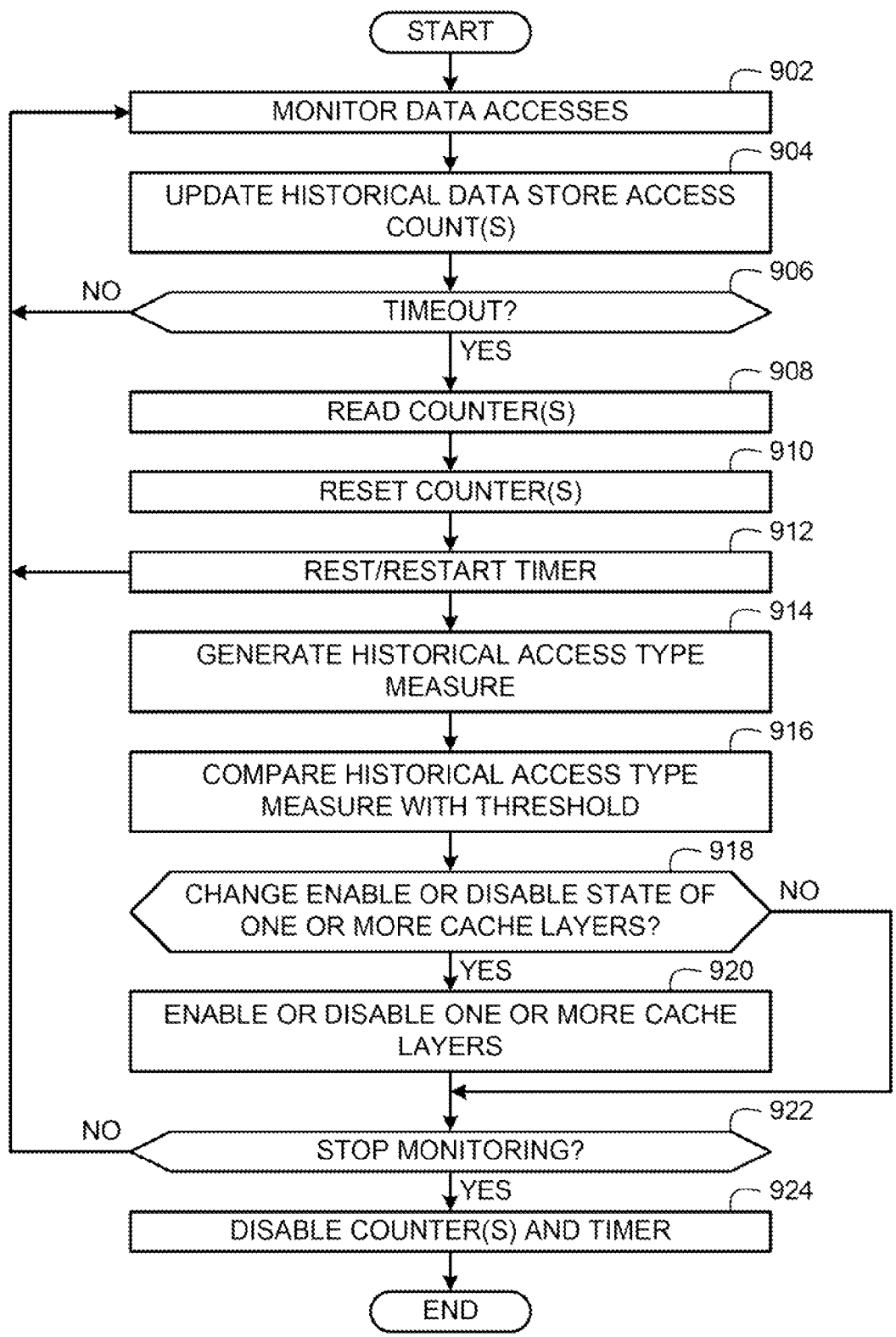
FIG. 9 depicts a flow diagram of an example process that can be used to selectively enable and/or disable different cache layers during use of the microdisk of FIGS. 2-6 based on historical data access type information.

FIGS. 7, 8, and 9 are example flow diagrams representative of processes that can be used to implement processes of the example microdisk 202 of FIGS. 2-6. In some examples, one or more of the example processes of FIGS. 7, 8, and/or 9 may be implemented using machine readable instructions that, when executed, cause a device (e.g., the local processor 214 of FIGS. 2, 3, 5, and 6, a programmable controller or other programmable machine or integrated circuit) to perform the operations shown in FIGS. 7, 8, and/or 9. For instance, the example processes of FIGS. 7, 8, and/or 9 may be performed using a processor, a controller, and/or any other suitable processing device. For example, the example processes of FIGS. 7, 8, and/or 9 may be implemented in coded instructions (e.g., computer readable instructions) stored on a tangible computer readable medium or tangible machine readable medium such as a flash memory, a read-only memory (ROM), and/or a random-access memory (RAM) associated with a processor or controller. As used herein, the term tangible computer readable medium is expressly defined to include any type of computer readable storage and to exclude propagating signals. Additionally or alternatively, the example processes of FIGS. 7, 8, and 9 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, the example processes of FIGS. 7, 8, and/or 9 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example processes of FIGS. 7, 8, and/or 9 may be implemented as any combination(s) of any of the foregoing techniques, for example, any combination of firmware, software, discrete logic, and/or hardware. Further, although the example processes of FIGS. 7, 8, and 9 are described with reference to the flow diagrams of FIGS. 7, 8, and 9, other methods of implementing the processes of FIGS. 7, 8, and 9 may be employed. For example, the order of execution of the blocks may be changed, and/or some of the blocks described may be changed, eliminated, sub-divided, or combined. Additionally, any or all of the example processes of FIGS. 7, 8, and 9 may be performed sequentially and/or in parallel by, for example, separate processing threads, processors, devices, discrete logic, circuits, etc.

FIG. 7 depicts a flow diagram of an example process that can be used to access data in the microdisk 202 of FIGS. 2-6. During operation, the microdisk 202 receives data access requests at the local processor 214 (block 702). The local processor 214 decodes the data access requests (block 704). If the local processor 214 determines that no cache layers (e.g., none of the selectively enableable cache layers 604a-c of FIG. 6) are enabled (block 706), the local processor 214 performs the requested data access requests directly to the data store 204 (FIGS. 2, 3, and 6) without use of any cache layer (block 708). Otherwise, if the local processor 214 determines that one or more cache layers is/are enabled, the local processor performs the requested data access requests through the one or more enabled ones of the cache layers (e.g., enabled ones of the selectively enableable cache layers 604a-c of FIG. 6) (block 710). The example process of FIG. 7 then ends.

FIG. 8 depicts a flow diagram of an example process that can be used to selectively enable and/or disable different quantities of cache layers (e.g., the selectively enableable cache layers 604a-c of FIG. 6) in the microdisk 202 of FIGS. 2-6. The example process of FIG. 8 is shown as having an initialization phase 802 and a data access request processing phase 804. During the initialization phase 802, the microdisk 202 is powered on (or enabled or exited from a low-power mode (e.g., a sleep mode)) and initializes its different portions (or subsystems) to begin receiving and processing data access requests. During the data access request processing phase 804, the microdisk 202 actively receives data access requests from external devices (e.g., network devices (e.g., client computers) or other microdisks) and performs data accesses on the data store 204 (FIGS. 2, 3, and 6).

Initially, during the initialization phase 802, the microdisk 202 performs one or more initialization operations (block 808) such as, for example, providing power to its subsystems from the power supply 602 and enabling/scaling clock signals. The local processor 214 determines a cache layer configuration for use in the microdisk 202 (block 810). For example, the local processor 214 can determine the quantity of the selectively enableable cache layers 604a-c to enable (or disable) based on a frequency of a memory access clock of the microdisk 202. As discussed above in connection with FIG. 6, the local processor 214 can use the clock sense 616 (FIG. 6) to determine the frequency of the memory access clock. After determining the cache layer configuration for use in the microdisk 202, the local processor 214 enables (or disables) zero or more of the selectively enableable cache layers 604a-c (block 812) using, for example, the cache layer enable lines 608 and the gate drivers 606a-c as discussed above in connection with FIG. 6. If the local processor 214 determines at block 810 that it can operate without using any cache, the local processor 214 disables all of the selectively enableable cache layers 604a-c at block 812.

During the data access request processing phase 804, the local processor 214 receives and processes data access requests (block 814). The local processor 214 determines whether it should change its cache layer configuration (block 816). For example, the local processor 214 can determine to change its cache layer configuration any time the clock sense 616 detects a change in the frequency of the memory access clock of the microdisk 202. If the local processor 214 determines that it should change its cache layer configuration (block 816), the local processor 214 determines a different cache layer configuration (block 818). For example, the local processor 214 can determine a different quantity of the selectively enableable cache layers 604a-c to enable (or disable) to, for example, maintain acceptable memory access performance and/or to preserve a write endurance of the non-volatile data store 204. The local processor 214 then enables (or disables) zero or more of the selectively enableable cache layers 604a-c (block 820) using, for example, the cache layer enable lines 608 and the gate drivers 606a-c as discussed above in connection with FIG. 6. Control then returns to block 814. An example process that can be used to implement blocks 816, 818, and 820 is described below in connection with the flow diagram of FIG. 9.

In the illustrated example of FIG. 8, if the local processor 214 determines that it should not change the cache layer configuration of the microdisk 202, the local processor 214 determines whether it should power down (block 824) (e.g., based on a command received via the network interface 618 of FIG. 6). If the local processor 214 determines that it should not power down, control returns to block 814. Otherwise, the local processor 214 powers down the microdisk 202 (block 826) and the example process of FIG. 8 ends.

FIG. 9 is a flow diagram of an example process that can be used to selectively enable and/or disable different cache layers (e.g., the selectively enableable cache layers 604a-c of FIG. 6) during use of the microdisk 202 of FIGS. 2-6 based on historical data access type information. Initially, the memory controller 622 (FIG. 6) monitors data accesses (block 902) received at the microdisk 202 to access data in the non-volatile data store 204. The write counter 624 and/or the read counter 626 (FIG. 6) update their respective historical data store access count(s) (block 904). For example, for each write data access, the write counter 624 can increment its count by one or more increments and for each read data access, the read counter 626 can increment its count by one or more increments as described above in connection with FIG. 6. In some examples, if the microdisk 202 evaluates whether to enable/disable cache layers based on a write access rate, the write counter 624 is updated and the read counter 626 is not used. In other examples, if the microdisk 202 evaluates whether to enable/disable cache layers based on a write-to-read ratio, both of the write counter 624 and the read counter 626 are updated.

The memory controller 622 determines whether a timeout period has expired (block 906). For example, the memory controller 622 can poll the timer 628 (FIG. 6) to determine whether a duration of interest has expired. Example durations tracked using the timer 628 are described above in connection with FIG. 6. If the timeout has not expired (block 906), control returns to block 902. If the timeout has expired (block 906), control advances to block 908.

The local processor 214 reads the write counter 624 and/or the read counter 626 (block 908) by, for example, loading the counts into respective registers. The memory controller 622 then resets the write counter 624 and/or the read counter 626 (block 910), and resets and restarts the timer 628 (block 912). From block 912 control returns to block 902 to continue to monitor and track data accesses and control also advances to block 914.

The local processor 214 generates a historical access type measure (block 914) based on the write count and/or read count obtained at block 908. In some examples, the historical access type measure is a write access rate based on the write count tracked by the write counter 624 and the duration tracked by the timer 628 (e.g., based on dividing the write count by the duration). In other examples, the historical access type measure is a write-to-read ratio determined by dividing the write count by the read count.

The local processor 214 compares the historical access type measure with a threshold (block 916). In some examples, the threshold may be predetermined at fabrication time of the microdisk 202 and/or may be settable by software and/or firmware during operation of the microdisk 202. Some example thresholds may be set based on the types of applications that will be accessing data in the microdisk 202 and/or the type(s) of use(s) of the microdisk 202.

The local processor 214 determines whether to change the enable or disable state of one or more cache layers 604a-c (FIG. 6) (block 918) based on the comparison of block 916. For example, if the one or more cache layers 604a-c are disabled and if the historical access type measure is a write access rate (or a write-to-read ratio) that exceeds a threshold, the local processor 214 may determine that it should change the enable/disable state of the one or more cache layers 604a-c to enable the one or more cache layers 604a-c because the occurrences of relatively more write accesses were observed. However, if the one or more cache layers 604a-c are already enabled, the local processor 214 need not change the enable/disable state of the one or more cache layers 604a-c because they are already enabled to handle the occurrences of the relatively more write accesses. If the one or more cache layers 604a-c are enabled and if the historical access type measure is a write access rate (or a write-to-read ratio) that falls below a threshold, the local processor 214 may determine that it should change the enable/disable state of the one or more cache layers 604a-c to disable the one or more cache layers 604a-c because the occurrences of relatively less write accesses were observed. However, if the one or more cache layers 604a-c are already disabled, the local processor 214 need not change the enable/disable state of the one or more cache layers 604a-c because they are already disabled to allow direct access to the non-volatile data store 204.

If the local processor 214 determines that it should not change the enable/disable state of the one or more cache layers 604a-c (block 918), control advances to block 922. However, if the local processor 214 determines that it should change the enable/disable state of the one or more cache layers 604a-c (block 918), the local processor 214 enables or disables the one or more cache layers 604a-c (block 920) based on the analysis of blocks 916 and 918.

The local processor 214 then determines whether the microdisk 202 should stop monitoring data accesses (block 922). For example, if the microdisk 202 is put into a low-power mode (e.g., a sleep mode, an idle mode, a standby mode, turned off, etc.), the local processor 214 determines that it should stop monitoring data accesses. If the microdisk 202 is to continue monitoring data accesses (block 922), control returns to block 902. Otherwise, control advances to block 924, at which the local processor 214 or the memory controller 622 disables the write counter 624 and/or the read counter 626 and the timer 628. The example process of FIG. 9 then ends.

Figure 10:
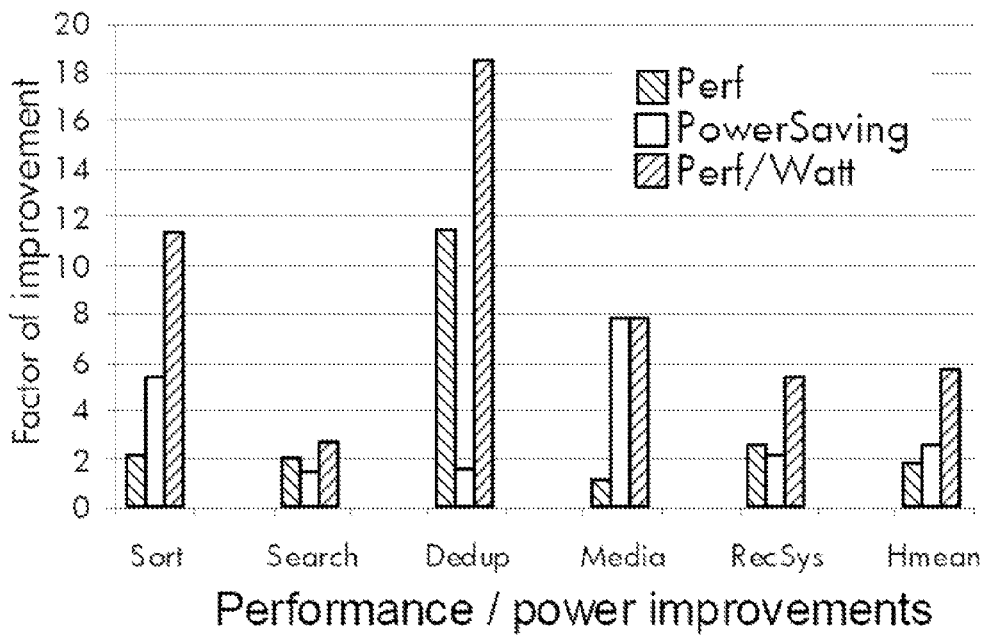
FIG. 10 is a bar graph showing performance and power improvements of the example microdisk blade server of FIG. 3 over the known data storage system of FIG. 1.
Figure 11:
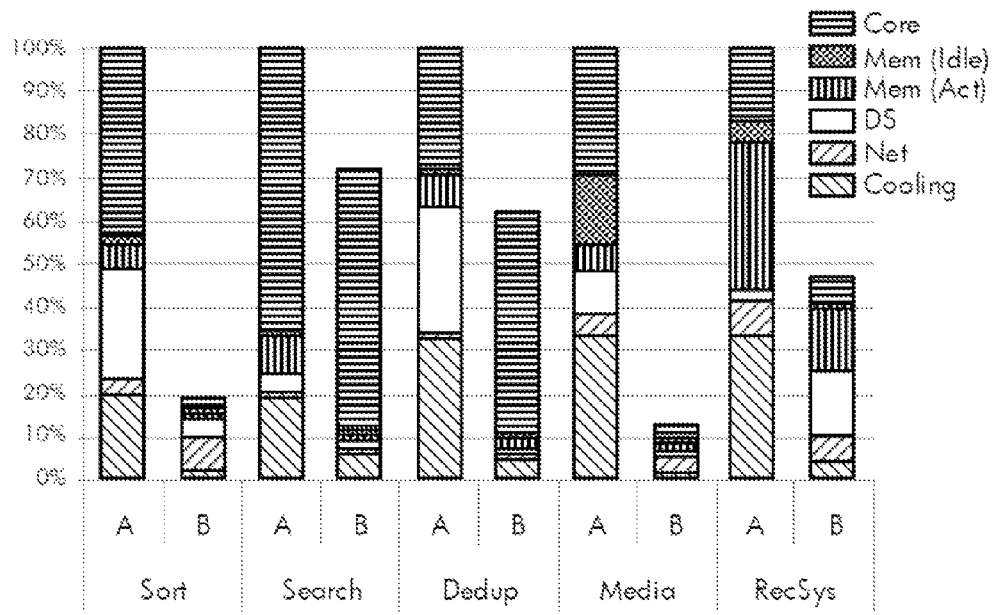
FIG. 11 is a bar graph showing power consumption breakdowns for different subsystems of the example microdisk blade server of FIG. 3 compared to power consumption breakdowns of the known data storage system of FIG. 1.

Turning now to FIGS. 10 and 11, bar graphs depicted therein show performance and power improvements and power breakdowns of the example microdisk blade server 300 of FIG. 3 compared to known data storage systems (having identical or substantially similar data storage capacity) such as the known data server 100 of FIG. 1. The measurements depicted in FIGS. 10 and 11 were obtained using high-level application-driven resource bottleneck analysis in combination with scaled-down detailed micro-architectural simulation. For power measurements, detailed inventory-based power models were used to observe peak power provisioning and actual consumption. The baseline system was aggressively chosen to reflect Moore's law scaling for both known system architectures (e.g., the known data server 100 of FIG. 1) and the workloads. The baseline system architecture was selected to include blades with two sockets of 32-core 80-watt (W) server processors. Each of the server processors was connected to four memory channels of 16 GB DIMMs, arrays of 4-terabyte (TB) hard drives at 250 MB/s or 1.2 TB solid-state devices (SSDs) at 1 GB/s, two 100 Gb/s Ethernet NICs, and a data-center networking infrastructure supporting full bi-section bandwidth.

FIG. 10 is a bar graph showing performance and power improvements of the example microdisk blade server 300 of FIG. 3 over the known data storage system of FIG. 1. Even compared to the aggressive baseline described above, the example microdisk blade server 300 of FIG. 3 achieves two-fold to eighteen-fold improvements in energy efficiency. While data access performance is comparable or better in most cases, a larger fraction of the improvements in performance-per-watt comes from improved energy savings versus improved performance.

FIG. 11 is a bar graph showing power consumption breakdowns for different subsystems of the example microdisk blade server 300 of FIG. 3 compared to power consumption breakdowns of the known data storage system of FIG. 1. In FIG. 11, the bars with notation 'A' correspond to power consumption measurements for the baseline architecture and the bars with notation 'B' correspond to power consumption measurements for the example microdisk blade server 300. The results of FIG. 11 illustrate the effectiveness of the example microdisk blade server 300 in combining energy-efficient organization with energy-efficient technologies. The results also show the adaptiveness of the example architecture of the example microdisk blade server 300 to the diversity of workload patterns.

Although the above discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the above describes example methods, apparatus, and articles of manufacture, the examples provided are not the only way to implement such methods, apparatus, and articles of manufacture.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A data storage apparatus, comprising:
   a cache layer;
   a processor in communication with the cache layer, the processor to dynamically enable or disable the cache layer via a cache layer enable line based on a data store access type, where the data store access type is one of a read access type and a write access type; and a read counter to track a read count of read accesses to a non-volatile data store and a write counter to track a write count of write accesses to the non-volatile data store, the read count and the write count to facilitate determining when to dynamically enable or disable the cache layer.

2. An apparatus as defined in claim 1, wherein the cache layer enable line gates off power from the cache layer.

3. An apparatus as defined in claim 1, further comprising a non-volatile data store in communication with the processor, the data store access type associated with a plurality of requests to access the non-volatile data store.

4. An apparatus as defined in claim 1, wherein the processor is to dynamically enable or disable the cache layer via the cache layer enable line based on a quantity of occurrences of data store access requests of the data store access type.

5. An apparatus as defined in claim 1, further comprising a memory controller in communication with the processor and a non-volatile data store, the processor to obtain historical access type information indicative of types of accesses to the non-volatile data store, the historical access type information to facilitate determining when to dynamically enable or disable the cache layer.

6. An apparatus as defined in claim 1, wherein the processor is to determine when to dynamically enable or disable the cache layer based on a write-to-read ratio of the write and read counts.

7. An apparatus as defined in claim 6, wherein the processor is to enable the cache layer when the write-to-read ratio exceeds a threshold, and the processor is to disable the cache layer when the write-to-read ratio is below the threshold.

8. An apparatus as defined in claim 1, wherein the processor is to enable the cache layer to prevent a rate of write accesses to a non-volatile data store that exceeds a threshold.

9. An apparatus as defined in claim 8, wherein the threshold is associated with a write endurance property of the non-volatile data store.

10. An apparatus as defined in claim 1, wherein disabling the cache layer comprises disabling the cache layer for a plurality of subsequent accesses to a non-volatile data store before enabling the cache layer.

11. An apparatus as defined in claim 10, wherein the subsequent accesses include single read accesses.

12. An apparatus as defined in claim 10, wherein the subsequent accesses include at least one burst mode access.

13. A data storage apparatus, comprising:
a non-volatile data store in a package;
a local processor in the package and in communication with the non-volatile data store, the local processor and the non-volatile data store forming a flattenable non-volatile data storage system using a dynamically disableable cache layer, the local processor in communication with an external communication interface of the package to exchange communications with devices external from the package; and
a read counter to track a read count of read accesses to the non-volatile data store and a write counter to track a write count of write accesses to the non-volatile data store, the read count and the write count to facilitate determining when to dynamically enable or disable the dynamically disableable cache layer.

14. An apparatus as defined in claim 13, wherein the local processor is to disable power delivery to the dynamically disableable cache layer to disable the dynamically disableable cache layer.

15. An apparatus as defined in claim 13, wherein the local processor is to determine when to dynamically enable or disable the dynamically disableable cache layer based on a write-to-read ratio of the write and read counts.

16. An apparatus as defined in claim 13, wherein the external communication interface is to communicate with different types of communication interfaces of the devices external from the package.

* * * * *